United States Patent
D'Hooren

[11] Patent Number: 6,093,365
[45] Date of Patent: Jul. 25, 2000

[54] PANEL OF MATERIAL SUCH AS, FOR EXAMPLE, A VEHICLE DOOR PANEL HAVING REINFORCEMENTS AND A HANDLE

[75] Inventor: Jean-Jacques D'Hooren, Gondecourt, France

[73] Assignee: Plastic Omnium Auto Interierur, Lyons, France

[21] Appl. No.: 08/776,405

[22] PCT Filed: Nov. 9, 1995

[86] PCT No.: PCT/FR95/01480

§ 371 Date: Jan. 13, 1997

§ 102(e) Date: Jan. 13, 1997

[87] PCT Pub. No.: WO97/17184

PCT Pub. Date: May 15, 1997

[51] Int. Cl.$^7$ .................................................. B29O 22/00
[52] U.S. Cl. ............................................................. 264/572
[58] Field of Search .................................... 264/572, 512, 264/573, 299, 328.1; 52/309.2, 630; 220/318

[56] References Cited

U.S. PATENT DOCUMENTS 5,387,391  2/1995  Satoh et al. .............................. 264/572
5,417,916  5/1995  Ladney .

FOREIGN PATENT DOCUMENTS 0585799  12/1994  European Pat. Off. .
0628395  12/1994  European Pat. Off. .
 628395  12/1994  European Pat. Off. .
2724131   3/1996  France .
2724214   3/1996  France .
40 02 503  5/1991  Germany .
 121820   5/1991  Japan .

OTHER PUBLICATIONS

Jaroschek, C.; "Internal Gas Pressure for Expelling Excess Melt"; Industrial & Production Engineering, vol. 15, No. 1, Mar. 1991, Munich, Germany.
Patent Abstracts of Japan; vol. 95, No. 2, Mar. 31, 1995. for Japan Patent 6,328,488, Nov. 29, 1994.

Primary Examiner—Michael Safavi
Attorney, Agent, or Firm—Harrison & Egbert

[57] ABSTRACT

A process for manufacturing a panel of material, intended, in particular, for forming an element of internal trim for a vehicle body, such as, for example, a door panel, including at least one layer (1), in particular of thermoplastic material, constituting a core, provided with an internal face (2) and an external face (3), therefor:

The core layer (1) is moulded between two dies (8, 9), with additional thicknesses (10) being provided locally, these being suitable for constituting reinforcing ribs (4) formed from the mass of the panel.

Gas is injected axially under pressure into the said additional thicknesses (10) in order to push the material of the said core layer (1) in such a way as to form tubular box girders 5.

The material pushed at the time of injecting the gas is diverted.

From the mass of the panel, at least one protuberance (7) is formed with the laterally diverted material.

6 Claims, 2 Drawing Sheets

PANEL OF MATERIAL SUCH AS, FOR EXAMPLE, A VEHICLE DOOR PANEL HAVING REINFORCEMENTS AND A HANDLE

TECHNICAL FIELD

The invention relates to a process for manufacturing a panel of material, intended, in particular for making an element of interior trim for a vehicle body such as, for example, a door panel.

The present invention also relates to the panels obtained using such a process.

BACKGROUND ART

Although more particularly designed for an application in the automotive sector, the process according to the invention can also be used in all fields of economic activity in which there is occasion to produce panels having both protuberances and reinforcing elements.

At the present time, there are known different panels provided with reinforcing ribs formed from the mass.

However, in the such panels, the material of the ribs does not possess a density gradient permitting characteristics of compactness in the vicinity of their surfaces that are sufficient to ensure satisfactory absorption of external mechanical stresses and thus reinforce the panel efficiently.

Furthermore, in order to manufacture panels having protuberances and reinforcing elements, one has recourse to conventional processes in three successive stages. Firstly, there is moulded, for example, a support layer. Next, an independently formed outer piece forming a protuberance is then added on. Finally, the reinforcing elements are fixed to the panel.

However, such techniques have the drawback of involving multiple manufacturing operations. Indeed, in order to obtain the finished article, it is necessary to form the support layer, the protuberance and the reinforcing elements separately, to provide on each of them means to permit their cooperation and then to fix them to one another.

In addition, such processes consume a large amount of materials, which contributes to increasing their overall cost price.

The object of the present invention is to provide a process for the manufacture of a panel having at least one protuberance and reinforcing elements that makes it possible to remedy the aforementioned drawbacks by providing for their formation from the mass of the article.

A further object of the present invention is to provide a process, as well as a panel obtained through its implementation, integrating, in one and the same structure, several functionalities such as, for example, in the case of a vehicle door panel, the internal trim of the body, thanks to the panel itself, the comfort of the passengers thanks to the protuberances which form, for example, handles, and enhanced safety thanks to the integrated reinforcing elements.

A further object of the present invention is to provide a process for the manufacture of a panel having satisfactory shock absorpting properties, particularly in the case of localised impact.

Another object of the present invention is to provide a process for the manufacture of a panel the reinforcing elements of which are constituted by a surface compacted material.

Another object of the present invention is to provide a process for the manufacture of a panel having reinforcing elements distributed locally according to the stresses to which the panel is subjected when in use.

Furthermore, one advantage of the invention is to make it possible to reduce the quantity of material consumed in order to manufacture the panel, and thus limit its cost and weight.

A further advantage of the present invention is to facilitate recycling of the panel.

Further objects and advantages of the present invention will emerge in the course of the following description, which is given only by way of illustration and is not intended to limit same.

SUMMARY OF THE INVENTION

The present invention relates to a process for manufacturing a panel of material, intended, in particular, for forming an element of internal trim for a vehicle body, such as, for example, a door panel, including at least one layer, in particular of thermoplastic material, constituting a core, provided with an internal face and an external face, characterised by the fact that:

the core layer is moulded between two dies, with additional thicknesses being provided locally, these being suitable for constituting reinforcing ribs formed from the mass of the panel;

gas is injected axially under pressure into the said additional thicknesses in order to push the material of the said core layer in such a way as to form tubular box girder like members;

the said material pushed at the time of injecting the gas is diverted laterally;

from the mass of the panel, at least one protuberance is formed with the said laterally diverted material.

The present invention also relates to a panel of material, obtained through implementation of the above described process, intended, in particular, for making an element of internal trim for a vehicle body such as, for example, a door panel, including at least one layer, in particular of thermoplastic material, forming a core, provided with an internal face and an external face, characterised by the fact that the said core layer has:

additional thicknesses suitable for constituting reinforcing ribs formed from the mass of the panel, forming tubular box girders;

at least one protuberance, also formed from the mass of the panel.

The invention will be more readily understood with reference to the following description, as well as to the annexed drawings, which form an integral part thereof.

DETAILED DESCRIPTION OF THE INVENTION

The present invention relates to a process for manufacturing a panel, intended, in particular, for making an element of internal trim for a vehicle body, such as, for example, a door panel.

Although more especially designed for an application in the automotive sector, the process according to the invention can also be applied in all fields of economic activity in which there is occasion to produce panels having both protuberances and reinforcing elements.

Figure 1:
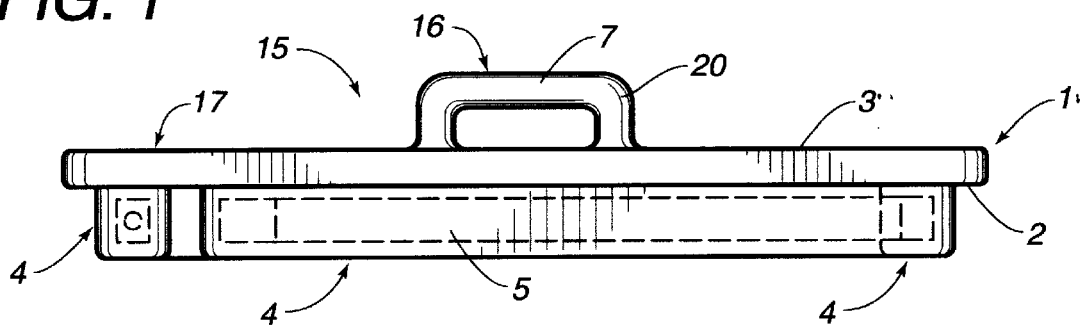
FIG. 1 is a side view of a piece obtained through implementing the process according to the invention.
Figure 2:
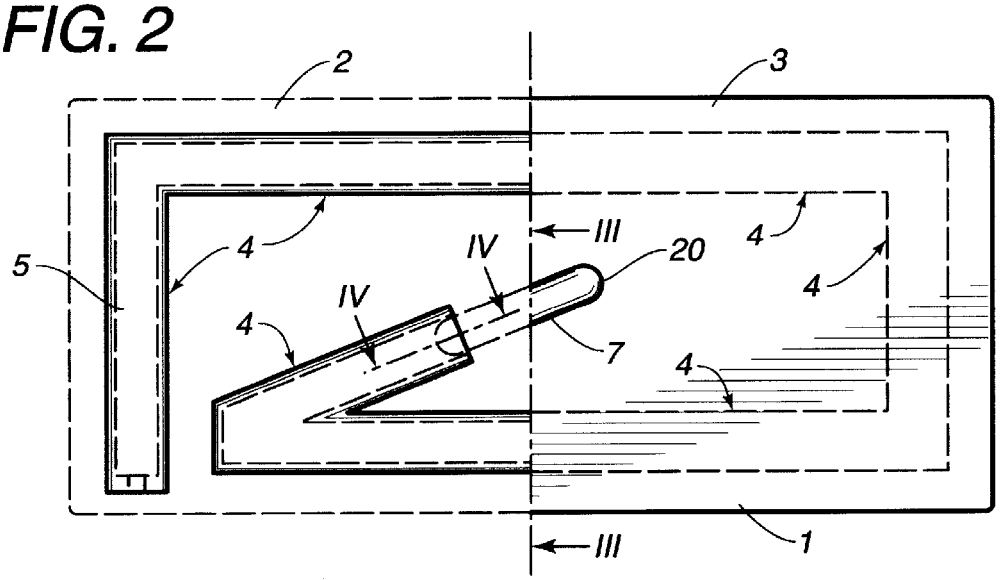
FIG. 2 is a front view of the piece shown in FIG. 1, the left-hand portion being a half-view more particularly representing its internal face and the right-hand portion being a half-view more particularly representing its outer face.

FIGS. 1 and 2 show a panel including at least one layer 1, in particular of thermoplastic material, forming a core provided with an internal face 2 and an external face 3.

As regards the nature of the material, in particular thermoplastic material, used, this can be, polypropylene, polyamide, polyurethane, acrylonitrile, butadiene, styrene or other material, reinforced, or otherwise, with rigidifying elements such as glass fibers.

According to the invention, the core layer 1 is moulded between two dies, one or more additional thicknesses 10 being provided locally. The latter constitute reinforcing ribs 4 formed from the mass of the panel.

Gas under pressure is then injected axially into the additional thicknesses 10 in order to push the material of the core layer 1 in such a way as to form tubular box girders 5. The term 'axially' is intended to mean in a rectilinear direction, substantially orthogonal to the thickness of the panel.

This structure makes it possible, for instance, to reinforce the characteristics of rigidity and impact strength, particularly in the case of localized impact.

Furthermore, according to the invention, the material pushed at the time the gas is injected is diverted laterally. Finally, at least one protuberance 7 is formed from the mass of the panel with the laterally diverted material.

The excess material is thus directly re-used in the formation of the article, whence a reduction in the total production cost.

Indeed, this process reduces the amount of material consumed and the number of manufacturing stages, as well as the intermediate stocks held. It further makes it possible to avoid an re-processing of the excess material, which is both difficult and costly.

Figure 3A:
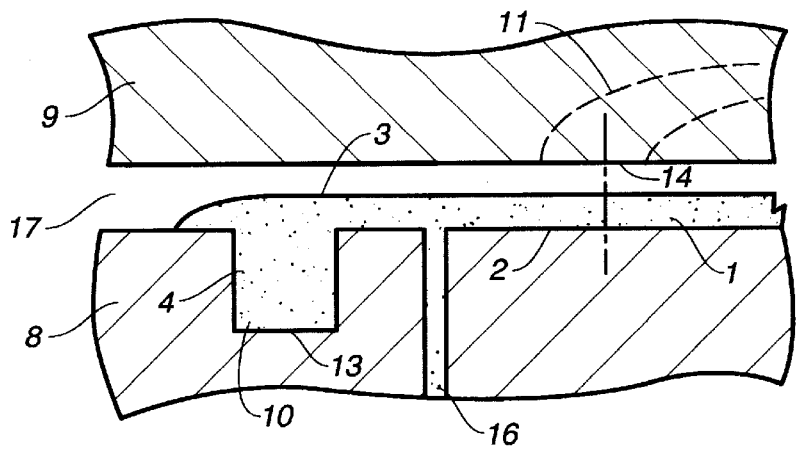
FIGS. 3a to 3d schematically represent, in cross-sectional view along line III-III of FIG. 2, the different stages in the manufacturing process according to the invention.

For this purpose, according to the example shown in FIG. 3a, the material is first introduced into the mould via a nozzle, not shown in the drawings, communicating with one or more conduits 16. The latter emerge(s) in a space 17 left free between dies 8, 9. The material is distributed in this space and into reserves or compartments 13, provided in order to produce the additional thicknesses 10.

FIGS. 3a to 3d being partial cross-sections, several compartments 13, as well as several conduits 16, can be provided according to the shape of the panel desired, although these are not visually represented in the drawings.

Figure 3B:
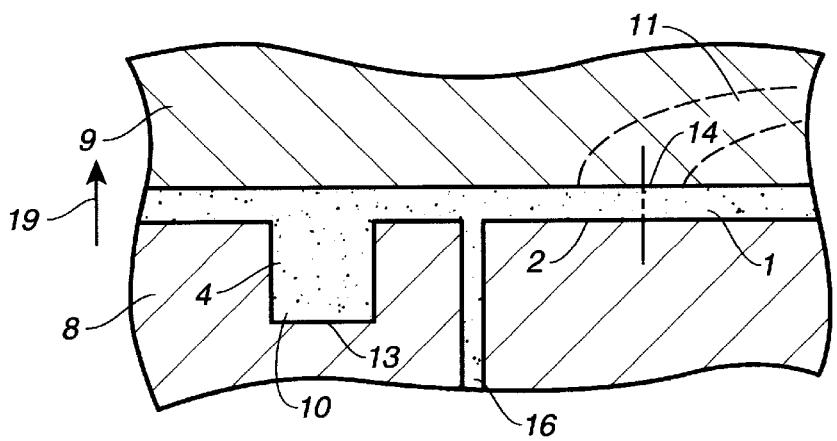

As shown in FIG. 3b, the core layer 1 is then moulded between dies 8, 9. This moulding can be injection-compression moulding.

This process in fact permits better distribution of the material and ensures satisfactory formation of additional thicknesses 10. The two dies 8, 9 are thus brought closer together in the direction of the arrow numbered 19.

Figure 3C:
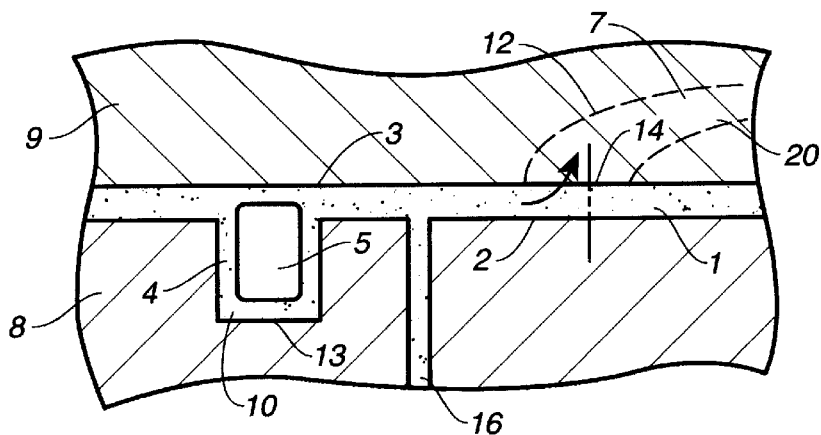

As shown in FIG. 3c, according to the exemplary form of embodiment illustrated, gas is then injected along the longitudinal axis of ribs 4. This operation serves to hollow out the additional thicknesses 10 and to compact the material constituting them on their peripheries so as to form in this way tubular box girders 5.

When the gas is injected, the material of the additional thicknesses 10 is also pushed along their longitudinal axes and thus forms a given quantity of surplus material that is diverted to form protuberance 7.

Figure 3D:
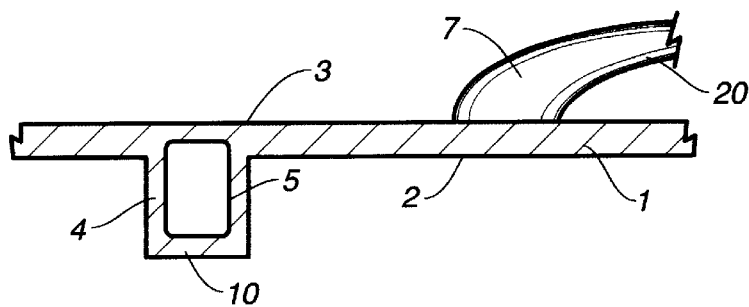

After the material has cooled down, the panel obtained, as illustrated in FIG. 3d, is removed from the mould.

Referring again to FIGS. 1 and 2, it will be noted that, according to the examplary form of embodiment of the invention illustrated, tubular box girders 5 are provided, in particular, on the interior face 2 side of core layer 1 at least partially, on the periphery of the panel and/or in the vicinity of the points on the panel intended to receive items of equipment or fittings.

It will also be noted that protuberance 7 is formed, in particular, on the external face 3 side of core layer 1 and a handle 20 is formed with the protuberance 7. These may, for instance, be retaining handles or grips, door handles or others.

Figure 4:
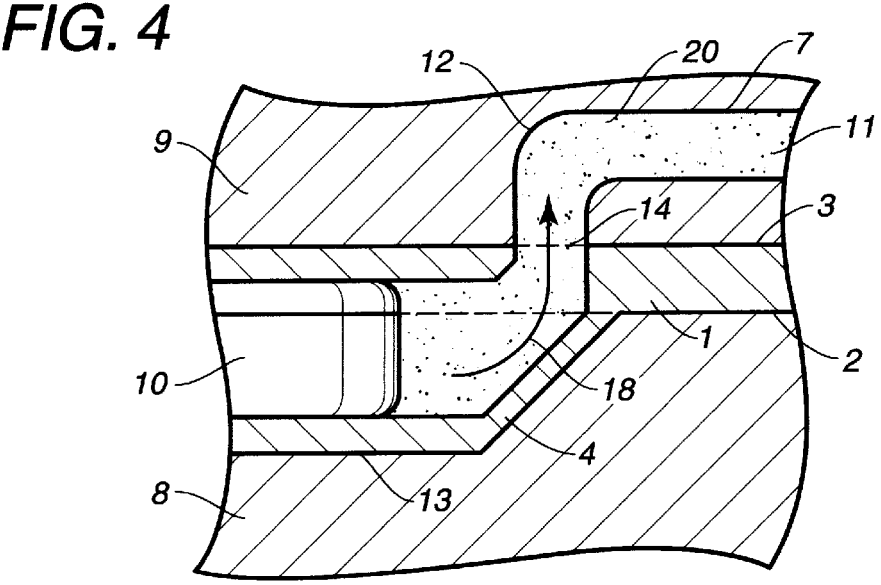
FIG. 4 is a cross-sectional view along line IV-IV of FIG. 2, which more especially illustrates the displacement of the material when the gas is injected.

As shown in FIG. 4, according to a particular examplary embodiment of the process according to the invention, an area 11 for discharge of the laterally diverted material is provided in one and/or the other of dies 8, 9 so as to permit the formation of the protuberance 7.

More precisely, according to the exemplary form of embodiment of the invention illustrated, part of the material of core layer 1 provided in a so-called lower die 8 is diverted towards at least one orifice 14 communicating with the discharge area 11, formed in the other, so-called upper die 9. This will be, in particular, the material of additional thicknesses 10.

Protuberance 7 and tubular box girders 5 are thus formed, for instance, on opposite faces of the panel.

Because of the viscosity of the material used and the appropriate temperature of the mould, a skin effect permits the congealing of the core layer 1 on its surface, while the material remains fluid in its center, which enables it to be displaced through the action of the injected gas, along the path indicated by arrow 18.

The present invention also relates to a panel obtained through implementation of the process described hereabove, intended, in particular, for making an element of internal trim for a vehicle body, such as a door panel, including at least one layer 1, in particular of thermoplastic material, forming a core, provided with an internal face 2 and an external face 3.

As illustrated, the core layer 1 has additional thicknesses 10, suitable for constituting reinforcing ribs 4 made from the mass of the panel, forming tubular box girders 5, as well as at least one protuberance 7, also formed from the mass of the panel.

According to one particular form of embodiment of the invention, tubular box girders 5 and protuberance 7 are provided on opposite faces of the panel.

By way of example, core layer 1 thus has the tubular box girders 5 distributed, in particular, over its internal face 2 in such a way as to reinforce locally its rigidity characteristics.

The tubular box girders 5 can be distributed, at least partially, on the periphery of the panel and/or in the vicinity of the points of the latter designed to receive items of equipment or fittings. In the event of the invention being applied to a door panel, the article can have tubular box girders 5 in the vicinity of glove compartments, arm rests, etc.

Furthermore, core layer 1 has protuberance 7, in particular, on its external face 3.

In addition, according to the example illustrated, the protuberance 7 forms a handle 20. The panel according to the invention thus has additional functionalities, apart from its main function as trim, because of the comfort-providing protuberances 7 and reinforcing ribs 4.

According to one particular form of embodiment, handle 20 is secured to core layer 1 at both its ends.

Furthermore, the panel can be covered, at least partially, with a skin 15 formed by a cladding 16 on protuberance 17 and/or a cladding 17 on the panel, made, or not made, of the same material.

Other embodiments of the present invention, within the grasp of a man of the art, could, of course, have been contemplated without thereby departing from the scope of the present application.

What is claimed is:

1. A method for manufacturing a panel of material used as an element of interior trim of a vehicle body, the panel having at least one core layer of thermoplastic material having an internal face and an external face, the method comprising:

molding the core layer between two dies so as to have a local area of greater thickness than a remainder of the core layer, local area being formed on the internal face of core layer;

injecting gas axially under pressure into local area so as to push the thermoplastic material of core layer along a longitudinal axis of local area so as to form a tubular girder in local area;

diverting the thermoplastic material laterally through an orifice formed in an area of one of dies, step of diverting occurring during step of injecting gas; and forming at least one protuberance with the diverted thermoplastic material on the external face of core layer.

2. The method of claim 1, said step of molding being by injection-compression molding.

3. The method of claim 1, said step of injecting gas comprising the step of:

forming said tubular girder at least partially on a periphery of the panel.

4. The method of claim 1, said protuberance being a handle.

5. The method of claim 1, further comprising the step of:

injecting the thermoplastic material through a lower die of two dies into an area between two dies, orifice being in an upper die of two dies.

6. The method of claim 5, said lower die having at least one compartment, said step of molding the core layer comprising:

distributing thermoplastic material into said at least one compartment so as to form said local area.

\* \* \* \* \*